United States Patent [19]

Hiebert

[11] Patent Number: 4,489,822

[45] Date of Patent: Dec. 25, 1984

[54] FRUIT CUP DAMPENING DEVICE

[75] Inventor: Jacob F. Hiebert, Reedley, Calif.

[73] Assignee: Pennwalt Corporation, Philadelphia, Pa.

[21] Appl. No.: 459,177

[22] Filed: Jan. 19, 1983

[51] Int. Cl.[3] .......... B65G 47/84

[52] U.S. Cl. .......... 198/478; 198/843; 198/576

[58] Field of Search .......... 198/843, 834, 798, 478, 198/576, 800, 802, 703, 706, 424, 841; 474/94

[56] References Cited

U.S. PATENT DOCUMENTS

| | | | |
|---|---|---|---|
| 2,433,789 | 12/1947 | Searles et al. | 198/843 |
| 2,491,974 | 12/1949 | Hansen | 198/843 X |
| 2,506,779 | 5/1950 | Criger | 198/703 X |
| 2,793,516 | 5/1957 | McDermott | 198/834 |
| 3,034,636 | 5/1962 | Manna | 198/798 |
| 3,145,826 | 8/1964 | Loveland | 198/800 X |
| 3,145,829 | 8/1964 | Janouschek et al. | 198/706 |
| 3,342,306 | 9/1967 | Fabbri | 198/703 |

*Primary Examiner*—Joseph E. Valenza
*Assistant Examiner*—Jonathan D. Holmes

[57] ABSTRACT

Dampening device for cups employed with apparatus for automatically sorting articles, typically fruit and vegetables. Fruit, for example, when automatically sorted, are dropped into moving cups from singulators. A pin extending from a closed end portion of each cup depresses a pivotable spring-mounted dampening plate when impacted by the dropping fruit to thereby soften the impact. The dampened cup lessens bruising of the fruit as well as possible negative psychological effects associated therewith.

14 Claims, 10 Drawing Figures

FRUIT CUP DAMPENING DEVICE

STATEMENT OF THE INVENTION

This invention relates to the automatic sorting of articles such as fruit and the like, and more particularly to a device for dampening the impact of the fruit falling into moving cups for their subsequent sorting or processing.

BACKGROUND AND SUMMARY OF THE INVENTION

Fruits and vegetables, such as kiwis, apples, peaches, nectarines, plums, potatoes, avocados, and the like, are customarily sorted and/or graded in accordance with one or more physical characteristics. The articles, suitably fruits or vegetables, are deposited from loading chutes, for example, onto singulator conveyors, each of which carry or transport the articles in single file for depositing into moving cups for subsequent weighing, grading, color sorting, deflecting into cull bins, and the like. The constant impacting of the fruit for example, with the substantially non-yielding moving cups results in unnecessary bruising of some fruit, excessive noise, and the creation of possible negative psychological factors for both customer and operator.

The present invention provides dampening means, structurally removed from the cup but cooperating therewith, which is resiliently depressable by the cup when a fruit is dropped thereinto to thereby soften the impact between fruit and cup. More specifically, a horizontally extending pin secured to each cup adjacent a closed end portion thereof depresses a dampening plate. A plurality of such plates are pivotally mounted substantially circumferentially on rotating star wheels such that each fruit dropping into a cup causes the dampening plate to be controllably resiliently depressed to thereby soften the resultant impact. After impact, the dampening plates are spring urged to their original position. Stop means mounted to the star wheels control the extent of pivoting of the dampening plates; strength of the springs controls their degree of resiliency.

DETAILED DESCRIPTION OF THE INVENTION

A. Apparatus Employed With Present Invention

Figure 1:
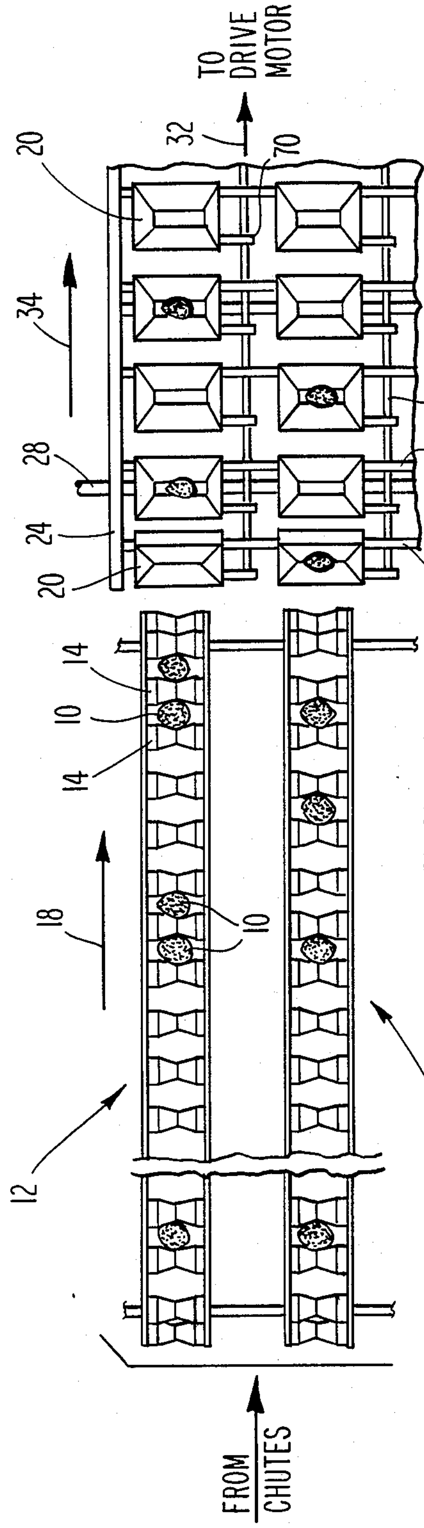
PRIOR ART Fig. 1
FIG. 1 is a fragmentary schematic plan view of prior art apparatus employed with the present invention, parts omitted for purposes of clarity.
Figure 2:
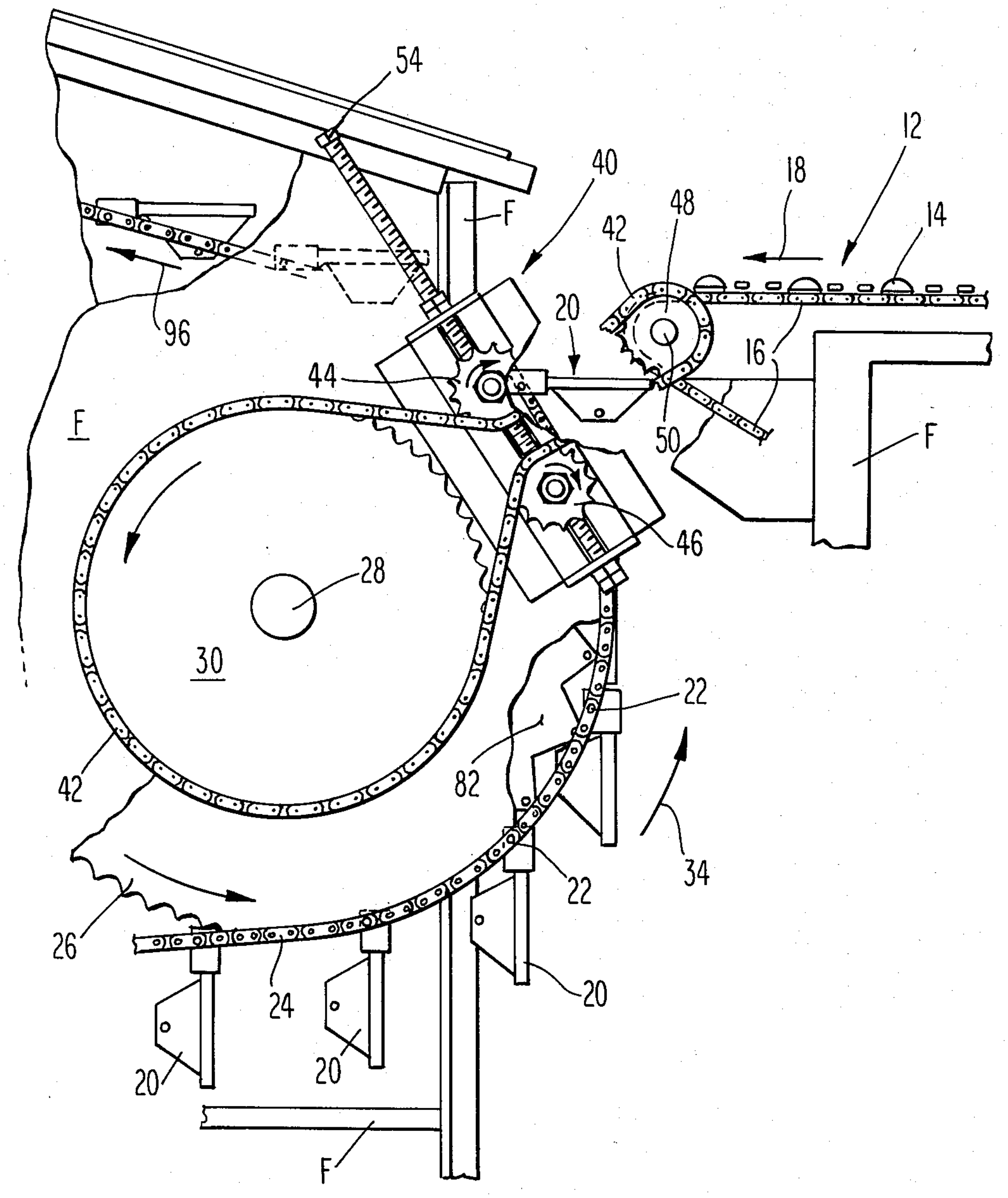
FIG. 2 is a fragmentary elevational view of the machine employed with the present invention, parts omitted for the sake of clarity, illustrating the timing means and respective positions of various components.
Figure 3:
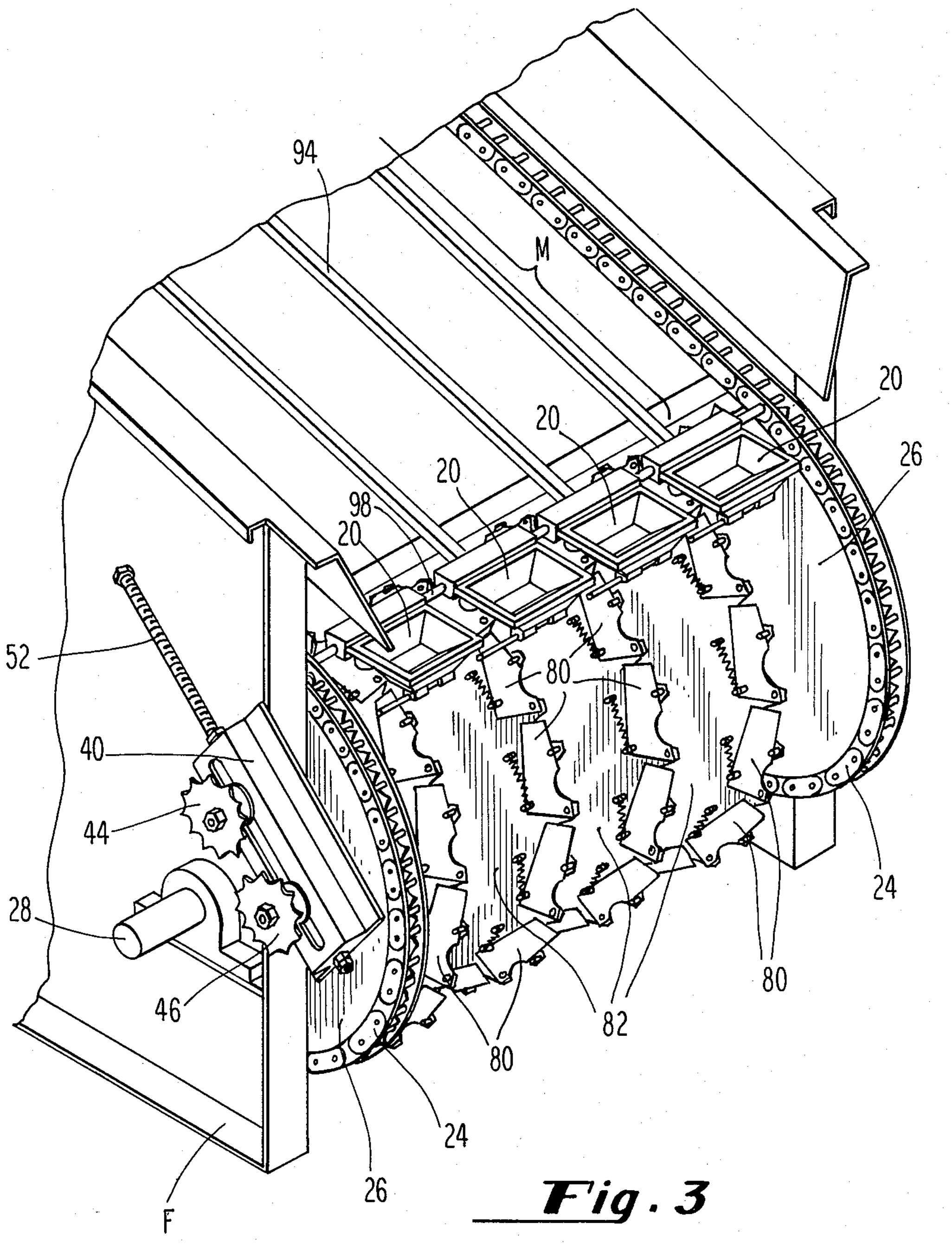
FIG. 3 is a perspective view of a portion of the apparatus of FIG. 2, parts omitted, showing relative positioning of the cup damping devices of the present invention.

In FIGS. 1, 2 and 3, articles, typically fruit such as kiwis 10, to be sorted by weight, color, and the like, are received from chutes and arranged in single file by an entrance portion of singulator or singulator conveyors 12, two such singulators being illustrated in FIG. 1.

Singulators 12 comprise a plurality of spaced apart molded grommets 14 driven by chains 16 (FIG. 2). Singulators 12 move in the direction indicated by arrow 18 and drop or deposit the kiwis 10 into cups 20, pivotally mounted to cup support rods 22 (FIGS. 1, 2, and 9) secured transversely between parallel disposed chains 24 and transported therewith. Chains 24 engage a pair of sprockets 26 which are mounted on a shaft 28 which also mounts a single timing sprocket 30 at one end, later described. Chains 24, and hence sprockets 26 and shaft 28, are driven by a suitable drive motor (not shown) disposed at the downstream end of the apparatus indicated by arrow 32 (FIG. 1). Cups 20 travel in the direction indicated by arrow 34. Frame members F support the apparatus employed with the present invention.

B. Timing Mechanism

Figure 4:
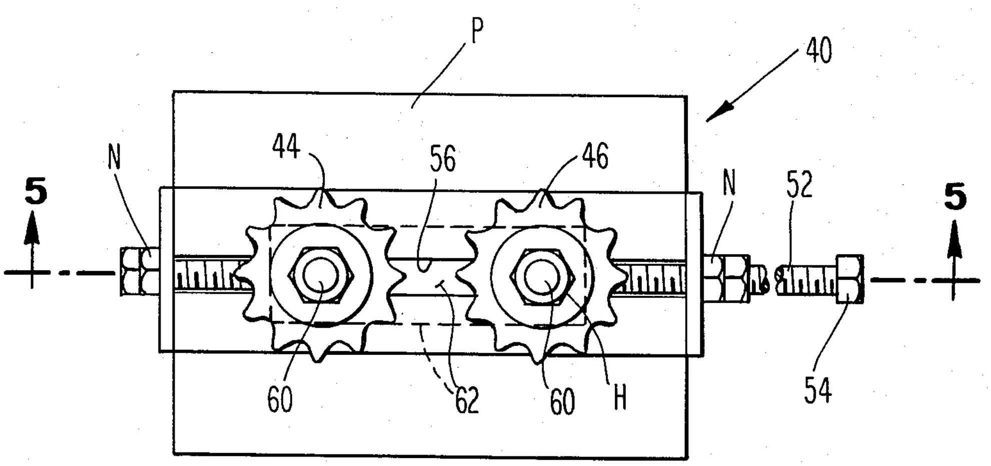
FIG. 4 is a plan view of timing mechanism illustrated in FIG. 2.
Figure 5:
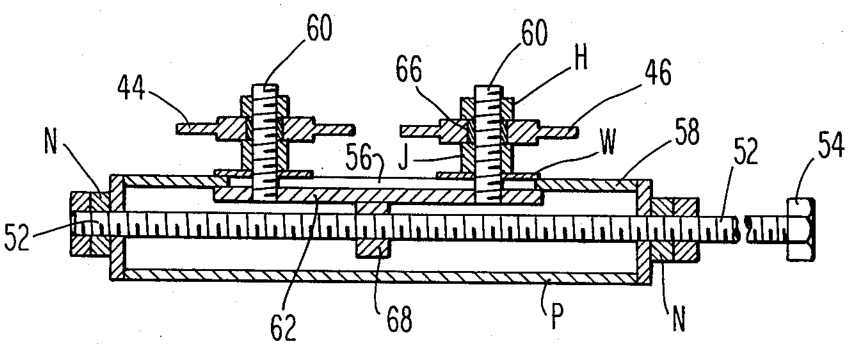
FIG. 5 is a longitudinal sectional view of the timing mechanism of FIG. 4 taken along line 5—5 thereof.

In order that fruit from singulators 12 are deposited into continuously moving cups 20 at the optimum moments, proper timing between singulator movement and cup movement is desirable. Accordingly, and referring to FIGS. 2, 4 and 5, a timing mechanism 40 is employed which may suitably be mounted to frame F by means of timing mechanism base plate P. A timing chain 42, engaged by timing sprocket 30, further engages a pair of idler gears 44 and 46 of timing mechanism 40. Timing chain 42 drives singulator conveyors 12 through singulator sprocket 48 mounted on singulator shaft 50. Rotation of screw 52 of timing mechanism 40 by means of thumb nut 54, welded to screw 52, causes idler gears 44 and 46 to move, as a unit, along slot 56, disposed longitudinally in an upper plate member 58 by means of the following mechanism: Gears 44 and 46 rotate around rods 60 which are threadedly mounted to a slide adjustment plate 62 or otherwise suitably secured thereto. Rods 60 extend through slot 56. Washers W, jam nuts J, and hex nuts H are disposed around rods 60 as shown. Bushings 66 may be employed to permit the idler gears to rotate freely around rods 60. A stationary nut 68 is held fast to a lower portion of slide adjustment plate 62 and aligned to threadedly receive screw 52. End nuts N are affixed to screw 52 as illustrated and rotate therewith. Now, as screw 52 is turned or rotated in one direction or the other by thumb nut 54, and since stationary nut 68 is prevented from rotating, slide adjustment plate 62 will be displaced longitudinally as rods 60 secured thereto traverse slot 56 carrying idler gears 44 and 46 therewith.

Referring again to FIG. 2, movement of idler gears 44 and 46 upwardly, or toward thumb screw 54, will tension that portion of timing chain 42 which articulates with idler gear 46 to displace molded grommets 14 slightly rearwardly, i.e., a maximum of a fraction of an inch. Conversely, lowering the idler gears by turning thumb screw 54 in the other direction advances the molded grommets. By means of the timing mechanism, synchronization between singulator conveyor movement and cup movement is readily optimized.

C. Cups and Dampening Plates

Figure 8:
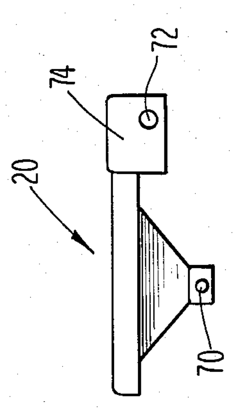
PRIOR ART Fig. 8
FIGS. 6, 7 and 8 are views of prior art fruit cups employed with the dampening device of the present invention.
Figure 7:
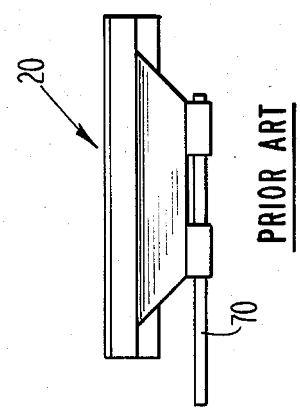
PRIOR ART Fig. 7
Figure 6:
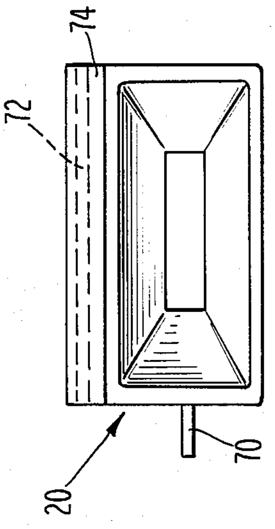
PRIOR ART Fig. 6

Cups 20, as stated above, are pivotally mounted on cup support rods 22 secured transversely between chains 24. Each cup 20 (FIGS. 6, 7 and 8) is provided with a pin 70 affixed to a lower or closed end portion of the cup. A bore 72 is provided through shoulder 74 for receiving cup support rod 22 therethrough to permit cup 20 to be pivotable therearound. Of course, cups 20 may be supported on cup support rods 22 by segmented shoulder portions (not shown) in lieu of a continuous solid shoulder as shown in FIG. 6 to reduce cost and weight of each cup.

Figure 9:
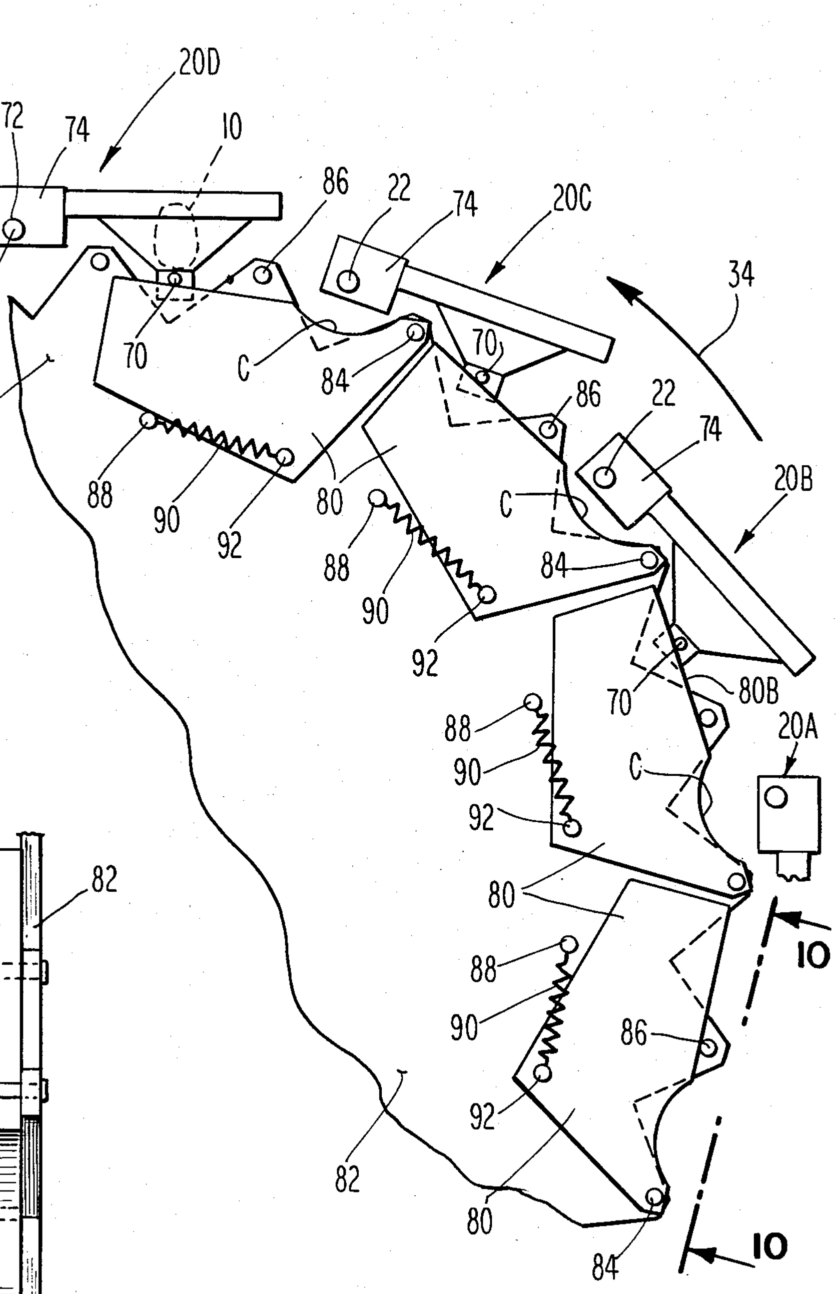
FIG. 9 is a schematic representation illustrating the operation of the dampening device of the present invention, parts omitted for purposes of clarity.
Figure 10:
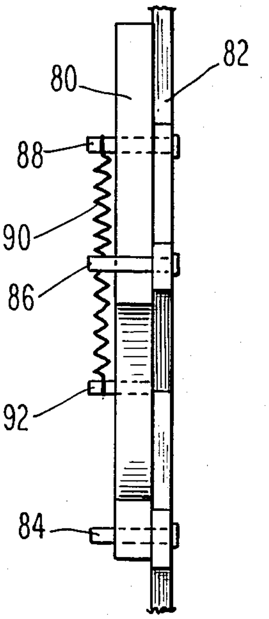
FIG. 10 is a view of the dampening device of FIG. 9 looking in the direction of arrows 10—10 thereof.

Cups 20 hang freely from their respective cup support rods 22 at the lower portion of sprocket 26 (FIG. 2). As sprocket 26 continues to rotate in the direction indicated by arrow 34 however, pins 70 of cups 20 contact dampening plates 80, pivotally mounted to star wheels 82 adjacent their peripheries (FIGS. 9 and 10). Star wheels 82 are rotated by shaft 28.

More specifically, each star wheel 82 (4 star wheels shown in FIG. 3) is provided with 12 dampening plates 80 spaced uniformly therearound, although the invention is not thus limited. Each dampening plate 80 is pivotally mounted to each star wheel 82 by a pivot pin 84 which permits each dampening plate to pivot between a pair of stop pins, i.e., an outer stop pin 86 and an inner stop pin 88, both secured to star wheel 82. Springs 90 are connected between inner stop pins 88 and spring pins 92, the latter being affixed to dampening plates 80. Springs 90 urge dampening plates 80 against outer stop pins 86.

D. Operation of Dampening Plates

It is appreciated that motion of chains 24 controls the rotation of star wheels 82 and movement of cups 20, as well as chain 42 which controls the timing of singulators 12. Thus, as star wheels 82 and dampening plates 80 mounted thereto rotate in the direction indicated by arrow 34, cups 20A, 20B, 20C and 20D, for example, rotate in the same direction (FIG. 9). So long as cups hang freely from their respective cup support rods, typically cup 20A and those cups shown disposed at the lower portions of sprocket 26 in FIG. 2, no contact between dampening plates 80 and cups 20 results. However, as star wheel 82 continues to rotate, pin 70 of cup 20B contacts outer surface 80B of dampening plate 80 to cause cup 20B to pivot slightly around cup support rod 22 in a counterclockwise direction to assume the position illustrated. The next preceding cup 20C meanwhile has pivoted even further while cup 20D has been impacted by a kiwi 10 dropped thereinto from singulator 12 to cause the pin 70 of cup 20D to resiliently depress plate 80 against the force exerted by spring 90 until plate 80 gently abuts inner stop pin 88, thereby softening or dampening the impact between falling fruit and moving cup. Spring 90 then gently urges dampening plate 80 to its original position against outer stop pin 86.

Cup 20D, with kiwi 10, is then transported up inclined plane M (FIG. 3), also indicated in FIG. 9. More specifically, as star wheels 82 continue to rotate, pins 70 of cups 20, with or without a kiwi contained therein, engage parallel disposed runners 94, typically polytetrafluoroethylene, to slide thereupon as they are carried up the inclined plane, its angle of inclination indicated generally by arrow 96 (FIG. 2). Inclined plane M permits fruit to be more positively retained in the cups. Downstream of inclined plane M, the fruit cups level off prior to weighing, sorting, and the like.

Plastic spacers 98 (FIG. 3) are provided between cups on each cup support rod to maintain the cups in proper alignment with the singulators.

The invention is not intended to be limited to the use of a pair of chains 24. If 9 lanes of cups 20 are employed, for example, in lieu of the 4 lanes shown in FIG. 3, additional chains will be added. Thus, additional chain sprockets 26 may be mounted to shaft 28 between the third and fourth lanes as well as between the sixth and seventh lanes (not shown). Cup support rods 22 will then be mounted through each of the 4 parallel disposed chains.

Similarly, if 6 lanes of cups are employed, it may be desirable to add another sprocket and chain between the third and fourth lanes. If larger articles are being sorted requiring larger cups, then a 6-cup lane might be provided with a total of 4 chains, i.e., with 2 lanes only between adjacent chains.

I claim:

1. Dampening device for article carrying cups employed in automatic apparatus comprising
   - first conveyance means for transporting articles in spaced disposition,
   - second conveyance means including carrying means, dampening means, and said article carrying cups, said carrying means moving a plurality of said article carrying cups into position for receiving said transported articles from said first conveyance means,
   - said dampening means cooperating with said moving cups when said transported articles are received thereinto including a plate pivotally mounted to said carrying means which is resiliently pivotally depressed by said cup when said article impacts said cup.

2. Dampening device of claim 1 wherein said carrying means comprises
   - (a) a plurality of spaced wheels rotating on a common shaft driven by parallel disposed chains, and
   - (b) spaced cup support rods secured transversely through each of said chains, said cups pivotally mounted on said cup support rods, and
   - said plates of said dampening means being resiliently pivotally mounted to said wheels adjacent peripheries thereof.

3. Dampening device of claim 2 further characterized by
   - spaced stop means affixed to said wheels for defining limits of pivoting for each of said dampening plates.

4. Dampening device of claim 3 wherein said stop means comprises a plurality of pairs of outer stop pins and inner stop pins.

5. Dampening device of claim 4 further characterized by spring means cooperating between said wheel and dampening plates, said spring means urging said dampening plates against said outer stop pins.

6. Dampening device of claim 5 wherein each of said spring means is connected between an inner stop pin and a pin mounted on said dampening plate.

7. Dampening device of claim 6 wherein said cups are each provided with a cup pin secured to a closed end thereof, said cup pins contacting said dampening plates to pivotally depress said dampening plates against said inner stop pins when said articles are deposited into said cups.

8. Dampening device of claim 7 wherein said cup pins extend horizontally from said cups to contact an outer surface of said dampening plates.

9. Dampening device of claim 9 wherein each of said cups is provided with a shoulder portion having a longitudinal bore therethrough, said bore receiving said cup support rod, said dampening plates provided with an arcuate cut-out portion at an outer surface thereof, said cut-out portion providing clearance between said shoulder portion of said cups and said dampening plates when said cup pins are in contact with outer surface of adjacent dampening plates.

10. Dampening device for cups employed in automatic sorting apparatus comprising conveyance means for transporting articles in spaced disposition, carrying means for continuously moving a plurality of said cups into receiving relationship for said transported articles, timing means for synchronizing deposition of said articles transmitted by said conveyance means into said continuously moving cups carried by said carrying means, dampening means for said continuously moving cups when said transported articles are synchronously received thereinto, said carrying means including (a) a plurality of wheels spaced apart rotating on a common shaft driven by parallel disposed chains, and (b) spaced cup support rods secured transversely through each of said chains, said cups mounted for pivotal movement on said cup support rods, said dampening means including a plurality of dampening plates resiliently pivotally mounted to each of said wheels adjacent the peripheries thereof, limiting means for controlling amount of pivot of each of said dampening plates when said transported articles are deposited into said moving cups.

11. Dampening device of claim 10 wherein said conveyance means deposited said transported articles in some of the cups.

12. Dampening device of claim 10 wherein said limiting means comprises a pair of stop pins.

13. Dampening device of claim 10 wherein said articles comprise fruits and vegetables.

14. Dampening device of claim 10 wherein each of said dampening plates is pivotally mounted to said wheels by a pivot pin, and said dampening plates pivot around said pivot pin in the same direction as said wheels are rotating.

* * * * *